United States Patent Office 3,843,524
Patented Oct. 22, 1974

3,843,524
PROCESS FOR THE INHIBITION OF SWELLING OF SHALE IN AQUEOUS ALKALINE MEDIUM
Alphonse C. Perricone, Homer F. Young, George W. Bettge, and Dorothy P. Enright, Houston, Tex., assignors to Milchem Incorporated, Houston, Tex.
No Drawing. Filed June 6, 1972, Ser. No. 260,219
The portion of the term of the patent subsequent to Oct. 2, 1990, has been disclaimed
Int. Cl. C10m 3/04; E21b 43/16
U.S. Cl. 252—1                               35 Claims

ABSTRACT OF THE DISCLOSURE

The inhibition of swelling of shale in aqueous alkaline medium is accomplished by contacting the shale with an inhibiting amount of a polyvalent metal ion complexed by a component selected from the class consisting of acetic, citric, formic, lactic, oxalic and tartaric acids, the alkali metal and ammonium salts and mixtures thereof.

BACKGROUND OF THE INVENTION

1. FIELD OF THE INVENTION

The invention relates to a process to inhibit the adsorption of aqueous medium by shales in aqueous alkaline environments. The process may be used as a pre- or post-treatment of shales as hereinafter defined.

2. DESCRIPTION OF THE PRIOR ART

Inhibition of swelling (hereinafter referred to as simply "inhibition") of hydratable shales have long been problems faced by colloid chemists and those skilled in arts where these materials are commercially utilized. For example, the manufacture and use of ceramics, pigments, drilling fluids, soil stabilization and construction have frequently encountered the problems of shale swelling. By "shales" and "shale" is meant to refer to materials such as bentonite and the like, claystones and "gumbo"-type colloidal-clay substances and related substances which possess the property of hydrodynamic volume increase when exposed to aqueous environments. Of particular importance is geological formation gumbo encountered in the drilling of subterranean wells. These shales hydrate in water rather easily and may swell to many times their original size. By "swelling" we mean to refer to the hydrodynamic volume increase of the shale. By "inhibit", "inhibition" and "inhibition of swelling" we mean the ability of a process to retard the hydration of shales whereby they remain cohered and basically in their original size, shape and volume said process being either a pre-treatment of the shale wherein to an aqueous system is added the complex as utilized herein and thereafter adding the shale, or as a post-treatment wherein the complex is added to a shale which is either in a partially or fully hydrated state. The aqueous alkaline medium can be fresh water, sea water, a brine or the like.

Shales have been formed by geologic compaction and compression of small minute particles and sediments throughout the ages. Liquid in the particles and sediments is removed as layers of sediments compact. As pressure upon the formation increases, the liquid escapes to more permeable formations.

Shales have varying degrees of dispersibility in water. The softer shales will disperse rather quickly while the harder shales will be more resistant to the dispersion phenomenon. It is believed that ionic forces play as important role in the susceptibility of the shale to dispersion. For example, a shale having a large amount of montmorillonite containing cations in exchange positions, will be more readily dispersible. As a result, these shales can have strong swelling pressures when exposed to alkaline medium.

Swelling of shales is believed to be attributable to at least three phenomena: surface hydration, interlayer swelling and osmotic swelling. Surface hydration is particularly active in shales because of high surface area. Shales may have a lattice-type structure which allows the liquid to be adsorbed between layers as well as upon the particle surface. On the other hand, osmotic swelling occurs because the clay surface ions are more concentrated than in the liquid itself. This force draws the liquid into the shale particle. Of course, the degree of the osmotic effect depends on salt concentrations both in the shale particle and in the liquid.

In the past, shale swelling has been somewhat reduced by replacing monovalent exchangeable cations with divalent cations such as calcium. Many amine-type compositions have been used but have not been entirely satisfactory. Not only are these compositions expensive, but they may oil-wet surfaces.

When shale suspensions are anionically charged, the charge is neutralized by adsorption of cations on shale surfaces. Since this will form an electrolyte double layer, the particles will repel each other and will disperse. Because the adsorbed cations appear to be the major contributing force to this phenomenon, it is believed that swelling can be greatly reduced by utilization of polyvalent metal ions. Polyvalent metal ions such as aluminum and the like are more tightly adsorbed than monovalent ions such as sodium.

A factor involved in the use of polyvalent metal ions is their precipitation in alkaline environments. In fact, some ionic materials may even precipitate out of solution at acid pH's. This is exemplified by the use of a base and aluminum, which will produce a multi-dimensional polymer which will form an octahedral structure between shale layers. However, to produce such a soluble polymer, no greater than about 2.4 OH groups per metal ion should be added. Additionally, this polymer is stable only in acidic environments. When exposed to alkaline pH's, the aluminum ion will precipitate out of solution. Thus, the ion must be reacted in such a fashion so that its normal tendency to precipitate is either entirely eliminated or greatly reduced. Such a result can be achieved by reacting the ion to form a complex. Under some circumstances, complexing of the ion may produce a chelate structure.

Aluminum lignosulfonate complexes which have been prepared by treating basic calcium lignosulfonate with aluminum sulfate and thereafter with a solution of an organic acid selected from the group consisting of acetic, formic, lactic, oxalic and tartaric acid having the property of partially replacing lignosulfonate in the aluminum complex have been used primarily as viscosity modifying agents for aqueous drilling fluids. For example, in United States Pat. No. 2,771,421, it is disclosed that calcium lignosulfonate can be treated with aluminum sulfate so that the sulfate is equivalent to the lime present in the organic precipitate of the purified calcium lignosulfonate. Oxalic or other organic acid is later added in a preferred amount of 11% of the weight of the lignin present. The material is said to at least partially prevent the swelling and heaving of shales found in drilled formations. However, it is possible that the presence of the lignosulfonate material may reduce the effectiveness of aluminum to function in a complex state strictly as an inhibitor of shale swelling. In fact, the presence of lignosulfonate, depending upon its concentration, may actually contribute to the dispersion of the shale. In other words, the aluminum and the lignosulfonate function to achieve completely different results. The inability of the composition of this patented teaching to be completely effective is believed to be caused by possible complex competition of the lignosulfonate with the organic acid for the available aluminum ion.

It has now been discovered that swelling of shales in aqueous alkaline medium can be dramatically inhibited by use of polyvalent metal ion complexes which are believed to adhere to the internal and/or external surfaces of the shale particle and which are not easily removable by electrolytic forces.

It is therefore an object of this invention to provide a process for the inhibition of the swelling of shale in aqueous alkaline environments.

Other objects and advantages of the use of the present invention will be apparent from a reading of the specification, examples, and claims which follow.

SUMMARY OF THE INVENTION

The invention utilizes a process to inhibit swelling of shales in aqueous alkaline environments which comprises contacting the surface of the shale particle with an inhibiting amount of a polyvalent metal ion complexed by a component selected from the class consisting of acetic, citric, formic, lactic, oxalic and tartaric acids, alkali metal and ammonium salts and mixtures thereof.

DESCRIPTION OF THE PREFERRED EMBODIMENTS

Our process utilizes a complex which is obtained by reacting a polyvalent metal ion with a component selected from the class consisting of acetic, citric, formic, lactic, oxalic and tartaric acids, the alkali metal and ammonium salts and mixtures thereof.

By polyvalent metal ion, we mean to refer to and claim metallic ions which normally precipitate out of alkaline aqueous solutions if not complexed. For example, the following metals can be complexed for use in the present process:

| Metal series | Valence |
| --- | --- |
| Aluminum | 3 |
| Barium | 2 |
| Bismuth | 3, 5 |
| Chromium | 2, 3 |
| Cobalt | 3, 4 |
| Copper | 2 |
| Iron | 2, 3 |
| Lanthanum | 3 |
| Magnesium | 2 |
| Manganese | 2, 3, 4 |
| Nickel | 3 |
| Tin | 2, 4 |
| Titanium | 3, 4 |
| Zinc | 2 |
| Zirconium | 3, 4 |

The complex may be prepared in an aqueous solution by subjecting the selected polyvalent metal ion to a sufficient quantity of the complexing component in order to prevent precipitation of the metal ion in alkaline media. Preferably, the metal ion is utilized in the form of a water soluble salt such as chromium sulfate, aluminum sulfate, aluminum chloride, or the like. The metal ion may be used in a solid state or in a hydrated form. When utilizing an anhydrous metal ion starting material, the reaction may be preferably conducted in an aqueous system. Catalytic heat may be required to increase the kinetics of the reaction. However, the reaction will go to completion at ambient temperature. After dissolving the metal ion in solution, and, if utilized, after the addition of heat, the complexing component is added and heated or allowed to stabilize for a short period of time (generally about 15 to 45 minutes) to form the complex. The solvent is then removed by methods ordinarily known to those skilled in the art, such as by vacuum and the like. The resulting material may then be ground to provide a high surface area product.

In preparation of the material utilized in the present invention, it is not necessary that it be prepared in solution. When utilizing a non-solvent preparation system, the metal ion material may be simply blended with the complexing compound. This preparation will normally not require use of catalytic heat.

As discussed above, the function of the complexing component is to complex the metal ion so that it will not precipitate out of solution in alkaline medium. Generally speaking, a 1-to-1 equivalent weight ratio of metal ion to complexing component is preferred. An excess of complexing component over metal ion has not been found to be critical and ranges in excess of 1-to-1 may be successfully used. Ratios of reactants below 1-to-1 on an equivalent weight basis may also be utilized. For example, when aluminum sulfate is used to supply the metal ion, it has been found that the metal ion may be complexed with, for example, citric, oxalic and tartaric acids in equivalent weight ratios as low as 1-to-2 to provide a complex that will prevent the metal ion from precipitating out of solution in alkaline environments. Generally speaking, any ratio of metal ion to complexing component which will prevent precipitation of the metal ion in alkaline environments may be used. An exact minimum cannot be given for all metals with each complexing component because of many factors and variables which may enter into the reaction of the complex with the shale. The selection of the particular metal ion and its form will greatly vary the necessary amount of complexing component required to form the resulting complex. Also, the selected complexing component will be a factor. Additionally, the particular alkaline environment in which the complex is utilized must be considered. However, since the object of using a complexed structure is to provide sufficient metal ion for purposes of inhibition of swelling, titration and related testing procedures can be used to determine the amount of metal ion which is adsorbed by a selected shale. For the selected use, samples of shale in the selected environment may be separated into at least two specimens. The first specimen should not be exposed to a complex and should serve as a base, blank or check. The second or succeeding samples should be exposed to several concentrations of complexes prepared at varying equivalent weight ratios of the selected metal ion to complexing component. By visual observation and shale inhibition tests, as, for example, used in the Examples below, a determination can be made of the particular complex and inhibiting concentration thereof to be utilized for the selected application. Thereafter, a titration test can be utilized to determine the amount of metal ion material which will be necessary to replenish the adsorbed ion in the aqueous alkaline solution. For example, see Furman, *Scott's Standard Method of Chemical Analyses*, Vol. 1, Sixth Edition, p. 50 (Van Nostrand Company, Inc., March 1962). Where the presence in the aqueous system of any material which would color the system and render such a test inapplicable, the following modification could be utilized:

1. Pipette a 3.0 to 10.0 ml. sample of aqueous medium into a 250 ml. beaker. The medium is then made acidic with hydrochloric acid, boiled for several minutes and diluted to approximately 150 ml.
2. Add 20 ml. of 30% sodium potassium tartarte solution
3. Adjust the pH of the sample to 8.3 with .02N NaOH using a pH meter to determine the end-point which is reached when, after the addition of one drop of .02N NaOH, the sample pH remains constant at 8.3 for one minute.
4. Add 20 ml. of 20% potassium fluoride solution and stir the sample for 5 minutes.
5. Back titrate the sample to pH 8.3 with .02N HCl using a pH meter to determine the end-point which is reached when, after the addition of one drop of .02N HCl, the sample pH remains constant for one minute.

In the case of aluminum, the metal content of the sample, calculated as grams of complex per ml. solution, is equal to:

$$\frac{(ml._{HCl} \times N_{HCl})(8.9938)}{(Vol. sample, ml.)(F)(1000)}$$

where F=percent by weight of metal ion in the complex expressed as a decimal fraction.

The process of the present invention utilizes the complex as formed above either as a pre-treatment, i.e., before the shale is substantially exposed to an aqueous medium to inhibit swelling, or as a post-treatment, i.e., to inhibit swelling of the shale after exposure to the aqueous medium.

Although not fully understood, it has been found that there is a pronounced electrochemical difference between varying ratios of metal ion material to complexing component. For example, in the case of a 1-to-0.6 equivalent weight ratio aluminum sulfate-citric acid complex has been shown in electrophoretograms to be slightly positively charged at pH 10.0, whereas the equal equivalent weight ratio complex at the same pH was found to be essentially neutral.

It is believed that some of the complexes form chelate structures. For example, a Werner-type complex is believed to result from the reaction of aluminum sulfate with citric acid and may have the following structure:

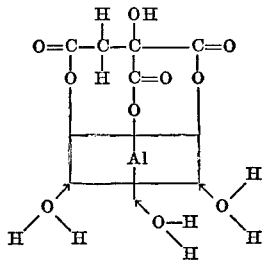

The formula is believed to be $(Al\ Ct)^0\ (3\ H_2O)^0$ when fully complexed. This complex would also be in equilibrium with positively charged aluminum represented by the formula $(Al\frac{2}{3}CtH_2O)^{+1}(\frac{1}{3}Ct+H_2O)^{-1}$. A shift in the equilibrium in this direction would be expected when the citrate ion is diminished.

Inhibition of swelling of shale particles can be determined by many tests. We have particularly relied upon tests determining rheological characteristics of suspended systems. In the tests described below, rheology has been determined at room temperature by utilizing a Model 35 Fann Viscometer, a common instrument for measuring rheological properties of suspensions, and is widely accepted by many industries where rheological data is relevant. Fann viscometers are of the concentric cylinder type where the test fluid is contained in an annular space between cylinders. Rotation of the outer cylinder at known velocities is accomplished through precision gearing causing a torque to be transmitted to the inner cylinder by the viscous drag of the fluid. This torque is balanced by a helical spring, and angular deflection is read from a dial or through suitable sensors on a meter or recorder. The amount of torque or shear stress at a given RPM is indicated in arbitrary degrees Fann, which may be converted into viscosity or apparent viscosity by appropriate calculation. The apparent viscosity of non-Newtonian fluids or viscosity of Newtonian fluids may be obtained from the Fann reading as follows:

Approximate viscosity of:
1. Degrees Fann at 600 R.P.M. × ½ = viscosity in centipoises
2. Degrees Fann at 300 R.P.M. × 1 = viscosity in centipoises
3. Degrees Fann at 200 R.P.M. × 1½ = viscosity in centipoises
4. Degrees Fann at 100 R.P.M. × 3 = viscosity in centipoises
5. Degrees Fann at 6 R.P.M. × 49 = viscosity in centipoises
6. Degrees Fann at 3 R.P.M. × 98 = viscosity in centipoises.

As shale hydrates, the particle will swell and will occupy a greater hydrodynamic volume than for the same shale which has not been hydrated or, alternatively, has been hydrated but less swollen. Thus, for a given shear rate, a hydrated, swollen particle will have a higher shear stress than will a hydrated but non-swollen particle. Particle swelling should not be confused with particle dispersion. A dispersed system can contain either swollen shale particles and/or non- or partially swollen shale particles. A deflocculant may provide a diflocculated system but may not necessarily inhibit swelling of the particle. Thus, an indication of swelling inhibition is the obtaining of a comparatively low Fann reading at high shear rates for a given concentration of solids.

To treat the shale surface for inhibition of swelling, a process should be utilized which encompasses the steps of:

(1) preparing an aqueous system;
(2) adding to said system a polyvalent metal ion, said ion being complexed by a component selected from the class consisting of organic acids selected from the class consisting of acetic, citric, formic, latic, oxalic and trataric, the alkali metal and ammonium salts and mixtures thereof;
(3) adjusting the pH of the system to above 7.0; and
(4) adding to said system shale to provide a suspension.

The pH can also be adjusted to the alkaline side in step (1) before the addition of the complex.

To inhibit a fully or partially hydrated shale a process should be utilized which comprises the steps of:

(1) exposing the shale to an aqueous medium containing a polyvalent metal ion, said ion being complexed by a component selected from the class consisting of organic acids selected from the class consisting of acetic, citric, formic, lactic, oxalic and tartaric, the alkali metal and ammonium salts and mixtures thereof; and
(2) adjusting the pH of the suspension to above 7.0.

Again, the pH of the medium an be adjusted to the alkaline side before the addition of the complex.

The following examples further illustrate the present invention:

EXAMPLE I

The present Example demonstrates a preparation of the polyvalent metal ion complex. Aluminum sulfate was blended with varying equivalent weight ratios of tartaric acid, citric acid and potassium bitartrate without use of solvent or heating. The following materials were formed:

TABLE 1

| Complex | Aluminum sulfate, wt., gm. | Tartaric acid, wt., gm. | Citric acid, wt., gm. | Potassium bitartrate, wt., gm. | Equivalent wt., ratio Al₂(SO₄)₃-complexing component | Al content, percent weight | Percent Al complexed |
|---|---|---|---|---|---|---|---|
| A | 39.98 | 10.81 | | | 1.0/0.4 | 6.38 | 40.0 |
| B | 39.98 | 13.51 | | | 1.0/0.5 | 6.05 | 50.0 |
| C | 39.98 | 16.21 | | | 1.0/0.6 | 5.76 | 60.0 |
| D | 39.98 | | 9.22 | | 1.0/0.4 | 6.58 | 40.0 |
| E | 39.98 | | 11.53 | | 1.0/0.5 | 6.29 | 50.0 |
| F | 39.98 | | 13.83 | | 1.0/0.6 | 6.02 | 60.0 |
| G | 39.98 | | | 13.55 | 1.0/0.4 | 6.05 | 40.0 |
| H | 39.98 | | | 16.94 | 1.0/0.5 | 5.69 | 50.0 |
| I | 39.98 | | | 20.33 | 1.0/0.6 | 5.37 | 60.0 |

EXAMPLE II

The present example demonstrates the effectiveness of a polyvalent metal ion complex to inhibit the swelling of shales when compared to an aluminum lignosulfonate, a material which acts as a dispersant and which may interfere with the inhibition properties of the metal ion.

An aluminum lignosulfonate was prepared by dissolving 300 grams of calcium lignosulfonate containing 5.6% by weight calcium in 658 cc. water to obtain solids of approximately 40% by weight at a pH of 4.6. This material was heated to 80° C. and was stirred for 30 minutes. Calcium sulfate was precipitated from the reaction medium by the addition of 85.24 grams of aluminum sulfate and was removed by filtration. The aluminum lignosulfonate filtrate was reheated to 80° C. and 50.17 grams of tartaric acid was added. After heating and stirring for 30 minutes, the pH was found to be 1.6. 38.7 grams of 50% by weight sodium hydroxide was added to raise the pH of the material to 2.6. The material was spray dried.

An aluminum tartrate complex was also prepared for evaluation purposes which did not contain lignosulfonate. The complex contained 1 mole aluminum to 1 mole of acid. 53.31 grams of aluminum sulfate was dissolved in 100 cc. of water and was heated to 80° C. 12.01 grams of tartaric acid was added and the solution was stirred at 80° C. for 30 minutes. The sample was dried at 80° C. under 23″ mercury vacuum and was ground.

The samples were evaluated for inhibition of shale swelling by using a 9% aqueous suspension of sodium bentonite. To 350 ml. of deionized water was added the selected sample. 35 grams of sodium bentonite was then added to each sample containing, respectfully, 5 grams of chrome lignosulfonate, 3% by weight potassium chloride, and 5 grams of the aluminum lignosulfonate-tartaric acid material made as above. The samples were mixed with the base shale using an electric mixer and the pH was adjusted with sodium hydroxide. The samples were heated in glass jars in a roller oven at 150° F. for 16 hours (hereinafter sometimes referred to as "hot rolling"), cooled to room temperature, and remixed on an electric blender. Rheology was determined both before and after hot rolling. The results of this test are as follows:

TABLE 2

| | Degrees Fann | | | | | | pH |
|---|---|---|---|---|---|---|---|
| | 600 | 300 | 200 | 100 | 6 | 3 | |
| Base, initial | 221 | 156 | 128 | 89 | 20 | 14 | 10.0 |
| Base, hot rolled | >300 | 243 | 206 | 154 | 48 | 36 | 9.3 |
| Complex, initial | 6.5 | 3 | 2 | 1 | 0 | 0 | 9.6 |
| Complex, hot rolled | 9 | 5 | 3 | 2 | 0 | 0 | 8.7 |
| Al-LSO$_3$, initial | 21 | 11 | 7.5 | 3.5 | 0 | 0 | 9.4 |
| Al-LSO$_3$, hot rolled | 26.5 | 14 | 10 | 5 | .5 | .5 | 8.0 |
| Cr-LSO$_3$, initial | 20 | 10.5 | 7 | 3.5 | 0 | 0 | 9.4 |
| Cr-LSO$_3$, hot rolled | 29.5 | 15 | 10 | 5.5 | .5 | .5 | 8.3 |
| KCl, initial | 22 | 18 | 16 | 14 | 12 | 13 | 9.4 |
| KCl, hot rolled | 45 | 37 | 33 | 30 | 25 | 26 | 7.9 |

EXAMPLE III

The present example demonstrates the ability of an aluminum sulfate tartaric acid complex to inhibit the swelling of sodium bentonite. Varying amounts of the complexes were dissolved in 350 ml. of deionized water after which the pH was adjusted to 9.5 with sodium hydroxide. Thirty-five grams of sodium bentonite was then added to the sample. Rheology was determined as in previous examples, both before and after hot rolling. The results of this test indicated that the complex was effective in varying amounts to inhibit the swelling of the sodium bentonite. All readings were extremely low and indicated low shear stress at all shear rates. The results of this test are as follows:

TABLE 3A.—UNTREATED SODIUM BENTONITE

| | Degrees Fann | | | | | | pH |
|---|---|---|---|---|---|---|---|
| | 600 | 300 | 200 | 100 | 6 | 3 | |
| Initial | 184 | 128 | 103 | 71 | 15 | 11 | 9.4 |
| DO | 195 | 137 | 111 | 77 | 17 | 12 | 9.5 |
| Hot rolled | 296 | 225 | 190 | 142 | 44 | 33 | 8.8 |
| DO | >300 | 234 | 198 | 148 | 47 | 35 | 9.3 |

TABLE 3B.—ALUMINUM SULFATE/TARTARIC ACID
[1/0.4 equivalent weight ratio]

| | Degrees Fann | | | | | | pH |
|---|---|---|---|---|---|---|---|
| | 600 | 300 | 200 | 100 | 6 | 3 | |
| 5 grams, initial | 8 | 4 | 3 | 1 | 0 | 0 | 9.6 |
| 5 grams, hot rolled | 12 | 6 | 4 | 2 | 0 | 0 | 9.1 |
| 2.5 grams, initial | 12 | 6 | 4 | 2 | 0 | 0 | 9.6 |
| 2.5 grams, hot rolled | 18 | 10 | 7 | 4 | .5 | .5 | 10.0 |
| 1.75 grams, initial | 17 | 9 | 7 | 4 | .5 | .5 | 9.9 |
| 1.75 grams, hot rolled | 25 | 14 | 10 | 6 | 0 | 0 | 10.2 |
| 0.88 grams, initial | 40 | 27.5 | 22.5 | 16.5 | 6 | 5 | 10.0 |
| 0.88 grams, hot rolled | 62 | 36 | 26 | 15 | 1 | 1 | 9.8 |

TABLE 3C.—ALUMINUM SULFATE/TARTARIC ACID
[1/0.5 equivalent weight ratio]

| | Degrees Fann | | | | | | pH |
|---|---|---|---|---|---|---|---|
| | 600 | 300 | 200 | 100 | 6 | 3 | |
| 5 grams, initial | 8 | 4 | 3 | 1.5 | 0 | 0 | 9.7 |
| 5 grams, hot rolled | 11 | 5.5 | 3.5 | 2 | 0 | 0 | 9.3 |
| 2.5 grams, initial | 12 | 6.5 | 4.5 | 2.5 | .5 | .5 | 9.7 |
| DO | 13 | 7 | 5 | 2.5 | .5 | .5 | 9.2 |
| 2.5 grams, hot rolled | 21 | 12 | 8.5 | 5 | 1 | 1 | 10.2 |
| DO | 26 | 15 | 11 | 6.5 | 1 | 1 | 8.8 |
| 1.75 grams, initial | 15.5 | 8 | 6 | 3 | 0 | 0 | 9.8 |
| DO | 15 | 8 | 5 | 3 | 0 | 0 | 9.5 |
| 1.75 grams, hot rolled | 22 | 12 | 8.5 | 5 | 1 | .5 | 10.0 |
| DO | 32 | 18 | 13 | 7.5 | 1 | 1 | 9.1 |
| 0.88 grams, initial | 39.5 | 27 | 22 | 16 | 6 | 4.5 | 10.0 |
| 0.88 grams, hot rolled | 68 | 33 | 24 | 13.5 | 1 | 1 | 10.1 |

TABLE 3D.—ALUMINUM SULFATE/TARTARIC ACID
[1/0.6 equivalent weight ratio]

| | Degrees Fann | | | | | | pH |
|---|---|---|---|---|---|---|---|
| | 600 | 300 | 200 | 100 | 6 | 3 | |
| 5 grams, initial | 8 | 4 | 2.5 | 1 | 0 | 0 | 9.7 |
| 5 grams, hot rolled | 14 | 7 | 5 | 3 | 0 | 0 | 9.5 |
| 2.5 grams, initial | 11.5 | 6 | 4 | 2 | 0 | 0 | 9.7 |
| 2.5 grams, hot rolled | 19 | 11 | 8 | 5 | 1 | 1 | 10.0 |
| 1.75 grams, initial | 16 | 8 | 6 | 3 | .5 | .5 | 9.7 |
| 1.75, grams, hot rolled | 25 | 13 | 9 | 5 | .5 | .5 | 9.8 |
| 0.88 grams, initial | 40 | 27 | 22 | 16 | 5 | 4 | 9.9 |
| 0.88 grams, hot rolled | 42 | 39 | 28.5 | 16.5 | 2 | 1.5 | 9.6 |

TABLE 3E.—ALUMINUM SULFATE/POTASSIUM BITARTRATE
[1/0.4 equivalent weight ratio]

| | Degrees Fann | | | | | | pH |
|---|---|---|---|---|---|---|---|
| | 600 | 300 | 200 | 100 | 6 | 3 | |
| 5 grams, initial | 8.5 | 4.5 | 3. | 2 | .5 | | 8.8 |
| 5 grams, hot rolled | 9.5 | 4.5 | 3.5 | 2 | 0 | | 7.9 |

TABLE 3F.—ALUMINUM SULFATE/POTASSIUM BITARTRATE
[1/0.5 equivalent weight ratio]

| | Degrees Fann | | | | | | pH |
|---|---|---|---|---|---|---|---|
| | 600 | 300 | 200 | 100 | 6 | 3 | |
| 5 grams, initial | 7.5 | 4 | 2 | 1 | 0 | 0 | 8.8 |
| 5 grams, hot rolled | 9 | 4 | 3.5 | 1 | 0 | 0 | 8.1 |

TABLE 3G.—ALUMINUM SULFATE/POTASSIUM BITARTRATE

[1/0.6 equivalent weight ratio]

| | Degrees Fann | | | | | | |
|---|---|---|---|---|---|---|---|
| | 600 | 300 | 200 | 100 | 6 | 3 | pH |
| 5 grams, initial | 7.5 | 4 | 2 | 1 | 0 | 0 | 8.9 |
| 5 grams, hot rolled | 10 | 5 | 4 | 2 | 0 | 0 | 8.1 |
| 2.5 grams, initial | 11 | 5.5 | 4 | 2 | .5 | .5 | 9.1 |
| 2.5 grams, hot rolled | 25 | 15 | 11 | 6.5 | 1 | .5 | 8.6 |
| 1.75 grams, initial | 15 | 7.5 | 5 | 2.5 | 0 | 0 | 9.5 |
| 1.75 grams, hot rolled | 33 | 19.5 | 14.5 | 9 | 2 | 1.5 | 8.7 |
| 0.88 grams, initial | 29 | 18 | 14 | 9 | 2 | 2 | 9.5 |
| 0.88 grams, hot rolled | 64 | 40 | 30 | 19 | 5 | 4 | 8.8 |

EXAMPLE IV

The present example demonstrates the ability of the complex to inhibit the swelling of a hydrated shale. Varying amounts of the complex were added to a 7% sodium bentonite suspension. After the addition of the selected sample, the pH of the suspension was adjusted to 9.5 with sodium hydroxide. Rheology was determined as in the examples above. The results of this test indicated that the complexes were equally effective in post-treatment inhibition processes. The results of this test are as follows:

TABLE 4A.—NO ADDITIVE

| | Degrees Fann | | | | | | |
|---|---|---|---|---|---|---|---|
| | 600 | 300 | 200 | 100 | 6 | 3 | pH |
| Blank, initial | 111 | 71 | 54 | 34 | 6 | 4.5 | 10.1 |
| Do | 109 | 70 | 54 | 34 | 6 | 4 | 9.3 |
| Blank, Hot Rolled | 149 | 100 | 79 | 52 | 9 | 6 | 9.4 |
| Do | 141 | 96 | 76 | 50 | 9 | 6 | 8.9 |

TABLE 4B.—ALUMINUM SULFATE/TARTARIC ACID

[1/0.4 equivalent weight ratio]

| | Degrees Fann | | | | | | |
|---|---|---|---|---|---|---|---|
| | 600 | 300 | 200 | 100 | 6 | 3 | pH |
| 5 grams, initial | 47 | 24.5 | 17 | 9 | 1 | 1 | 9.3 |
| Do | 44 | 24 | 16.5 | 9 | 1 | 1 | 8.8 |
| 5 Grams, hot rolled | 41 | 22 | 15 | 8 | 1 | 1 | 8.3 |
| Do | 43 | 23.5 | 16 | 9 | 1 | .5 | 8.0 |

TABLE 4C.—ALUMINUM SULFATE/TARTARIC ACID

[1/0.5 equivalent weight ratio]

| | Degrees Fann | | | | | | |
|---|---|---|---|---|---|---|---|
| | 600 | 300 | 200 | 100 | 6 | 3 | pH |
| 5 grams, initial | 45 | 24 | 16.5 | 9 | 1 | 1 | 9.2 |
| 5 grams, hot rolled | 44 | 23 | 16 | 8 | .5 | 0 | 8.4 |
| 2.5 grams, initial | 59 | 33 | 23 | 13 | 1.5 | 1 | 9.1 |
| 2.5 grams, hot rolled | 75 | 44 | 32 | 19 | 3 | 3 | 8.5 |
| 1.75 grams, initial | 70 | 40 | 29 | 16 | 1.5 | 1 | 9.3 |
| 1.75 grams, hot rolled | 94 | 56 | 42 | 25 | 4 | 3 | 9.0 |

TABLE 4D.—ALUMINUM SULFATE/TARTARIC ACID

[1/0.6 equivalent weight ratio]

| | Degrees Fann | | | | | | |
|---|---|---|---|---|---|---|---|
| | 600 | 300 | 200 | 100 | 6 | 3 | pH |
| 5 grams, initial | 46 | 25 | 17 | 9 | 1 | .5 | 9.3 |
| Do | 53 | 29 | 20 | 11 | 1 | 1 | 9.1 |
| 5 grams, hot rolled | 52.5 | 31 | 23 | 15.5 | 5 | 5 | 9.5 |
| Do | 53 | 29 | 20 | 11 | 1 | 1 | 8.4 |

TABLE 4E.—TARTARIC ACID

[Uncomplexed]

| | Degrees Fann | | | | | | |
|---|---|---|---|---|---|---|---|
| | 600 | 300 | 200 | 100 | 6 | 3 | pH |
| 5 grams, initial | 63 | 40 | 31 | 22 | 10 | 10 | 8.7 |
| 5 grams, hot rolled | 159 | 109 | 88 | 60 | 25 | 25 | 8.5 |

TABLE 4F.—ALUMINUM SULFATE

[Uncomplexed]

| | Degrees Fann | | | | | | |
|---|---|---|---|---|---|---|---|
| | 600 | 300 | 200 | 100 | 6 | 3 | pH |
| 5 grams, initial | | | To viscous to measure | | | | |
| 5 grams, hot rolled | 231 | 229 | 218 | 206 | 180 | 159 | 10.3 |

EXAMPLE V

Tests were run and results were evaluated to determine the effect of concentrations of aluminum sulfate-tartaric acid complexes to inhibit swelling of Vermilion Parish, Louisiana, "gumbo" shale. Five grams of varying ratios of an aluminum sulfate-tartaric acid complex were dissolved in 150 ml. of deionized water. The pH was then adjusted to 9.5 with sodium hydroxide. 200 grams of the "gumbo" was then added to each sample. The results indicated that at all tested ratios, the complex effectively inhibited the swelling of this shale. The results of this test are as follows:

TABLE 5A.—NO ADDITIVE

| | Degrees Fann | | | | | | |
|---|---|---|---|---|---|---|---|
| | 600 | 300 | 200 | 100 | 6 | 3 | pH |
| Blank, initial | 36 | 28 | 15 | 12 | 8 | 8 | 9.4 |
| Blank, hot rolled | 78 | 68 | 63 | 59 | 52 | 52 | 8.3 |

TABLE 5B.—ALUMINUM SULFATE/TARTARIC ACID

[1/0.4 equivalent weight ratio]

| | Degrees Fann | | | | | | |
|---|---|---|---|---|---|---|---|
| | 600 | 300 | 200 | 100 | 6 | 3 | pH |
| 5 grams, initial | 15 | 8 | 6 | 3.5 | 0 | 0 | 9.2 |
| 5 grams, hot rolled | 40 | 32 | 28 | 24 | 17 | 16 | 8.1 |

TABLE 5C.—ALUMINUM SULFATE/TATRTARIC ACID

[1/0.5 equivalent weight ratio]

| | Degrees Fann | | | | | | |
|---|---|---|---|---|---|---|---|
| | 600 | 300 | 200 | 100 | 6 | 3 | pH |
| 5 grams, initial | 15.5 | 9 | 7 | 5 | 1 | 1 | 9.2 |
| 5 grams, hot rolled | 43 | 33 | 29 | 25 | 17 | 16 | 8.2 |

TABLE 5D.—ALUMINUM SULFATE/TARTARIC ACID

[1/0.6 equivalent weight ratio]

| | Degrees Fann | | | | | | |
|---|---|---|---|---|---|---|---|
| | 600 | 300 | 200 | 100 | 6 | 3 | pH |
| 5 grams, initial | 16 | 9 | 7 | 5 | 1 | 1 | 9.2 |
| 5 grams, hot rolled | 41 | 30 | 27 | 23 | 15 | 15 | 8.3 |

EXAMPLE VI

The present example demonstrates the effectiveness of varying ratios of an aluminum sulfate-citric acid complex to inhibit swelling in aqueous alkaline environments containing sodium bentonite. The selected complexes were dissolved in 350 ml. of deionized water. The pH was then adjusted to 9.5 with sodium hydroxide. 35 grams of sodium bentonite was then added. Rheology was measured as in the above examples. The results of the test indicated that the complex was quite effective in inhibiting swelling of the shale samples. The results of this test are as follows:

TABLE 6A.—NO ADDITIVE

[1/0.25 equivalent weight ratio]

| | Degrees Fann | | | | | | |
|---|---|---|---|---|---|---|---|
| | 600 | 300 | 200 | 100 | 6 | 3 | pH |
| Blank, initial | 199 | 144 | 123 | 89 | 36 | 31 | 9.4 |
| Blank, hot rolled | >300 | 248 | 213 | 164 | 66 | 56 | 8.8 |

TABLE 6B.—ALUMINUM SULFATE/CITRIC ACID

[1/0.25 equivalent weight ratio]

| | Degrees Fann | | | | | | |
|---|---|---|---|---|---|---|---|
| | 600 | 300 | 200 | 100 | 6 | 3 | pH |
| 5 grams, initial | 10 | 5 | 3 | 1.5 | 0 | 0 | 9.1 |
| 5 grams, hot rolled | 11 | 6 | 4 | 2 | 0 | 0 | 8.2 |

TABLE 6C.—ALUMINUM SULFATE/CITRIC ACID

[1/0.3 equivalent weight ratio]

| | Degrees Fann | | | | | | pH |
|---|---|---|---|---|---|---|---|
| | 600 | 300 | 200 | 100 | 6 | 3 | |
| 5 grams, initial | 11 | 6 | 4 | 2 | .5 | .5 | 9.0 |
| 5 grams, hot rolled | 12 | 6 | 4 | 2 | .5 | .5 | 8.3 |

TABLE 6D.—ALUMINUM SULFATE/CITRIC ACID

[1/0.35 equivalent weight ratio]

| | Degrees Fann | | | | | | pH |
|---|---|---|---|---|---|---|---|
| | 600 | 300 | 200 | 100 | 6 | 3 | |
| 5 grams, initial | 11 | 5.5 | 4 | 2 | .5 | .5 | 8.8 |
| 5 grams, hot rolled | 12.5 | 6.5 | 4.5 | 2.5 | 1 | .5 | 8.2 |

TABLE 6E.—ALUMINUM SULFATE/CITRIC ACID

[1/0.4 equivalent weight ratio]

| | Degrees Fann | | | | | | pH |
|---|---|---|---|---|---|---|---|
| | 600 | 300 | 200 | 100 | 6 | 3 | |
| 5 grams, initial | 10 | 5 | 3.5 | 2 | 0 | 0 | 9.0 |
| 5 grams, hot rolled | 13 | 7 | 4.5 | 2 | 0 | 0 | 8.6 |
| 2.5 grams, initial | 14.5 | 7 | 5 | 3 | .5 | .5 | 9.3 |
| Do | 16 | 8 | 6 | 3 | .5 | .5 | 9.3 |
| 2.5 grams, hot rolled | 22 | 12 | 8.5 | 5 | 1 | .5 | 9.0 |
| Do | 30 | 17 | 12 | 7 | 1 | .5 | 8.9 |
| 1.75 grams, initial | 16 | 8 | 6 | 3 | 0 | 0 | 8.9 |
| Do | 18 | 10 | 7 | 3 | 0 | 0 | 9.3 |
| 1.75 grams, hot rolled | 31.5 | 19 | 14 | 8.5 | 1.5 | 1 | 9.6 |
| Do | 38.5 | 23 | 17 | 10.5 | 2 | 1.5 | 9.1 |
| 0.88 grams, initial | 33 | 19.5 | 15 | 9 | 1 | 1 | 9.5 |
| Do | 58 | 35 | 26 | 11 | 2 | 1 | 9.0 |

TABLE 6F.—ALUMINUM SULFATE/CITRIC ACID

[1/0.5 equivalent weight ratio]

| | Degrees Fann | | | | | | pH |
|---|---|---|---|---|---|---|---|
| | 600 | 300 | 200 | 100 | 6 | 3 | |
| 5 grams, initial | 9 | 4.5 | 3 | 1.5 | 0 | 0 | 9.2 |
| 5 grams, hot rolled | 15 | 8 | 5.5 | 3 | 0 | 0 | 8.8 |

TABLE 6G.—ALUMINUM SULFATE/CITRIC ACID

[1/0.6 equivalent weight ratio]

| | Degrees Fann | | | | | | pH |
|---|---|---|---|---|---|---|---|
| | 600 | 300 | 200 | 100 | 6 | 3 | |
| 5 grams, initial | 10 | 5.5 | 3.5 | 2 | .5 | .5 | 9.2 |
| Do | 10 | 5 | 3.5 | 2 | 0 | 0 | 8.7 |
| 5 grams, hot rolled | 17 | 9 | 7 | 4 | .5 | 0 | 8.7 |
| Do | 14 | 7 | 5 | 2 | 0 | 0 | 8.5 |
| 2.5 grams, initial | 14 | 7 | 5 | 2 | 0 | 0 | 9.6 |
| 2.5 grams, hot rolled | 26 | 14 | 10 | 5 | 0 | 0 | 9.3 |
| 1.75 grams, initial | 19.5 | 10.5 | 7.5 | 4 | .5 | .5 | 9.5 |
| 1.75 grams, hot rolled | 37 | 22 | 16 | 10 | 1 | 1 | 9.2 |
| 0.88 grams, initial | 34 | 21 | 16 | 10 | 1.5 | 1 | 9.8 |
| 0.88 grams, hot rolled | 71 | 44 | 33 | 20 | 3 | 2 | 9.2 |

TABLE 6H.—ALUMINUM SULFATE/CITRIC ACID

[1/0.8 equivalent weight ratio]

| | Degrees Fann | | | | | | pH |
|---|---|---|---|---|---|---|---|
| | 600 | 300 | 200 | 100 | 6 | 3 | |
| 5 grams, initial | 9.5 | 5 | 3.5 | 2 | .5 | .5 | 9.4 |
| 5 grams, hot rolled | 18 | 10 | 7 | 4 | 0 | 0 | 9.0 |
| 2.5 grams, initial | 15 | 8 | 6 | 3 | .5 | .5 | 9.5 |
| 2.5 grams, hot rolled | 28 | 16 | 12 | 7 | 1 | .5 | 9.2 |
| 1.75 grams, initial | 19 | 10 | 7 | 4 | .5 | .5 | 9.6 |
| 1.75 grams, hot rolled | 41 | 24 | 18 | 10 | 1.5 | 1 | 9.3 |
| 0.88 grams, initial | 35 | 21 | 16.5 | 11 | 1 | 1 | 9.7 |
| 0.88 grams, hot rolled | 75 | 47 | 36 | 22.5 | 3 | 3 | 9.2 |

TABLE 6I.—ALUMINUM SULFATE/CITRIC ACID

[1/1 equivalent weight ratio]

| | Degrees Fann | | | | | | pH |
|---|---|---|---|---|---|---|---|
| | 600 | 300 | 200 | 100 | 6 | 3 | |
| 5 grams, initial | 10 | 5 | 3.5 | 2 | .5 | .5 | 9.4 |
| 5 grams, hot rolled | 17.5 | 10 | 7 | 4 | 0 | 0 | 9.0 |
| 2.5 grams, initial | 15 | 7.5 | 5 | 2.5 | 0 | 0 | 9.6 |
| 2.5 grams, hot rolled | 24 | 13 | 9 | 5 | 0 | 0 | 9.4 |
| 1.75 grams, initial | 19 | 10.5 | 7.5 | 4 | .5 | .5 | 9.8 |
| 1.75 grams, hot rolled | 38 | 22 | 16 | 9 | 1 | 0 | 9.4 |
| 0.88 grams, initial | 45 | 29 | 22 | 15 | 3 | 3 | 9.8 |
| 0.88 grams, hot rolled | 78 | 49 | 38 | 24 | 5 | 4 | 9.1 |

EXAMPLE VII

Tests were run and results were evaluated to determine the effectiveness of a complex prepared by utilizing salts of a selected acid as the complexing component. Shale inhibition tests were run as in Example VI above. The results indicated that effective complexes could be utilized by incorporating salts of a selected acid to form the complex. The results of this test are as follows:

TABLE 7A.—ALUMINUM SULFATE/SODIUM CITRATE

[1/0.4 equivalent weight ratio]

| | Degrees Fann | | | | | | pH |
|---|---|---|---|---|---|---|---|
| | 600 | 300 | 200 | 100 | 6 | 3 | |
| 5 grams, initial | 11.5 | 6 | 4 | 2 | .5 | .5 | 9.0 |
| 5 grams, hot rolled | 17.5 | 10 | 7 | 4 | .5 | 0 | 8.9 |
| 2.5 grams, initial | 16.5 | 9 | 6 | 3 | .5 | .5 | 9.1 |
| 2.5 grams, hot rolled | 31 | 18 | 14 | 8 | 1 | .5 | 8.6 |
| 1.75 grams, initial | 19.5 | 10 | 7 | 4 | 0 | 0 | 9.4 |
| 1.75 grams, hot rolled | 42.5 | 25 | 19 | 11.5 | 3 | 1 | 9.0 |
| 0.88 grams, initial | 38 | 23 | 18 | 12 | 2 | 1.5 | 9.6 |
| 0.88 grams, hot rolled | 66 | 42 | 32 | 20 | 4 | 3 | 9.0 |

TABLE 7B.—ALUMINUM SULFATE/POTASSIUM CITRATE

[1/0.4 equivalent weight ratio]

| | Degrees Fann | | | | | | pH |
|---|---|---|---|---|---|---|---|
| | 600 | 300 | 200 | 100 | 6 | 3 | |
| 5 grams, initial | 8 | 4 | 3.5 | 1 | 0 | 0 | 9.2 |
| 5 grams, hot rolled | 19 | 11 | 8 | 4.5 | 1 | 1 | 8.6 |
| 2.5 grams, initial | 13.5 | 7 | 5 | 3.5 | .5 | .5 | 8.9 |
| 2.5 grams, hot rolled | 29 | 17 | 13 | 7.5 | 1.5 | 1 | 8.5 |
| 1.75 grams, initial | 17 | 9 | 6.5 | 3.5 | .5 | .5 | 9.2 |
| 1.75 grams, hot rolled | 39 | 23 | 17 | 10 | 1 | 1 | 8.8 |
| 0.88 grams, initial | 29 | 17 | 13 | 8.5 | 1 | 1 | 9.6 |
| 0.88 grams, hot rolled | 66 | 41 | 31 | 20 | 4 | 3 | 9.2 |

EXAMPLE VIII

Tests were conducted and results were evaluated to determine the ability of varying amounts of varying ratios of aluminum complexed with citric acid to inhibit the swelling of hydrated 7% suspensions of sodium bentonite. A selected amount of the sample complex was added to the suspensions and the pH was adjusted to 9.5 with sodium hydroxide. Rheology was determined as in previous examples. The results indicated that these complexes were effective in inhibiting the swelling of the sodium bentonite suspensions. The following results were obtained.

TABLE 8A.—NO ADDITIVE

| | Degrees Fann | | | | | | pH |
|---|---|---|---|---|---|---|---|
| | 600 | 300 | 200 | 100 | 6 | 3 | |
| Blank, initial | 95 | 64 | 50 | 35 | 10 | 9 | 8.9 |
| Do | 103 | 67 | 52 | 34 | 7 | 6 | 9.1 |
| Blank, hot rolled | 117 | 81 | 65 | 45 | 12 | 10 | 8.9 |
| Do | 180 | 127 | 103 | 72 | 15 | 11 | 9.0 |

TABLE 8B.—ALUMINUM SULFATE/CITRIC ACID

[1/0.4 equivalent weight ratio]

| | Degrees Fann | | | | | | pH |
|---|---|---|---|---|---|---|---|
| | 600 | 300 | 200 | 100 | 6 | 3 | |
| 2.5 grams, initial | 59 | 33 | 23.5 | 13 | 1.5 | 1 | 9.2 |
| 2.5 grams, hot rolled | 83 | 50.5 | 37.5 | 22.5 | 4 | 3 | 8.8 |
| 1.75 grams, initial | 66 | 38 | 28 | 16 | 2 | 1 | 9.3 |
| 1.75 grams, hot rolled | 89 | 53 | 40 | 24 | 3 | 2 | 8.9 |

TABLE 8C.—ALUMINUM SULFATE/CITRIC ACID
[1/0.6 equivalent weight ratio]

| | Degrees Fann | | | | | | |
|---|---|---|---|---|---|---|---|
| | 600 | 300 | 200 | 100 | 6 | 3 | pH |
| 2.5 grams, initial | 42 | 23 | 16 | 9 | 1 | .5 | 9.5 |
| 2.5 grams, hot rolled | 63 | 37 | 28 | 17 | 3 | 2 | 9.0 |
| 1.75 grams, initial | 50 | 28 | 20 | 12 | 1 | 1 | 9.3 |
| 1.75 grams, hot rolled | 70 | 42 | 32 | 19 | 3 | 2 | 9.0 |
| 0.88 grams, initial | 68 | 44 | 35 | 23 | 6 | 5 | 9.6 |
| 0.88 grams, hot rolled | 95 | 61 | 47 | 30 | 5 | 4 | 9.0 |

TABLE 8D.—ALUMINUM SULFATE/CITRIC ACID
[1/0.8 equivalent weight ratio]

| | Degrees Fann | | | | | | |
|---|---|---|---|---|---|---|---|
| | 600 | 300 | 200 | 100 | 6 | 3 | pH |
| 2.5 grams, initial | 45 | 26 | 19 | 11 | 1.5 | 1 | 9.4 |
| 2.5 grams, hot rolled | 61 | 37.5 | 28 | 17.5 | 4 | 3 | 8.8 |
| 1.75 grams, initial | 55 | 32 | 24 | 14 | 2 | 1 | 9.4 |
| 1.75 grams, hot rolled | 74 | 45 | 34 | 22 | 4 | 3 | 9.0 |
| 0.88 grams, initial | 71 | 46 | 37.5 | 25 | 8 | 7 | 9.7 |
| Do | 61 | 38 | 30 | 20 | 4 | 3 | 9.4 |
| 0.88 grams, hot rolled | 103 | 66 | 50 | 32 | 5 | 4 | 9.1 |
| Do | 89 | 57 | 44 | 28 | 5 | 4 | 8.9 |

TABLE 8E.—ALUMINUM SULFATE/CITRIC ACID
[1/1 equivalent weight ratio]

| | Degrees Fann | | | | | | |
|---|---|---|---|---|---|---|---|
| | 600 | 300 | 200 | 100 | 6 | 3 | pH |
| 2.5 grams, initial | 45 | 26 | 19 | 11 | 1 | 1 | 9.2 |
| 25 grams, hot rolled | 61 | 37 | 28 | 17 | 3 | 2 | 8.7 |
| 1.75 grams, initial | 56 | 35 | 27 | 17 | 2 | 2 | 9.4 |
| 1.75 grams, hot rolled | 74 | 45 | 34 | 21.5 | 4 | 4 | 8.8 |
| 0.88 grams, initial | 63 | 41 | 32 | 22 | 5 | 4 | 9.1 |
| Do | 61 | 39 | 30 | 21 | 4 | 3 | 9.5 |
| 0.88 grams, hot rolled | 97 | 66 | 50 | 32 | 5 | 4 | 8.8 |
| Do | 85 | 55 | 42 | 28 | 6 | 5 | 8.9 |

EXAMPLE IX

In order to determine the effectiveness of the complexes to inhibit the swelling of shales in environments other than deionized water, tests were conducted using 7% hydrated suspensions of sodium bentonite contaminated with 1,350 parts per million calcium ion and magnesium ion with 1.5% sodium chloride. Rheology was determined as in previous examples. The results of this test indicated that the complexes were equally effective in aqueous environments other than deionized water. The results are as follows:

TABLE 9A.—NO ADDITIVE

| | Degrees Fann | | | | | | |
|---|---|---|---|---|---|---|---|
| | 600 | 300 | 200 | 100 | 6 | 3 | pH |
| Blank, initial | 86 | 73 | 68 | 62 | 46 | 45 | 9.1 |
| Do | 79 | 67 | 63 | 58 | 45 | 43 | |
| Blank, hot rolled | 61 | 51 | 46 | 40 | 27 | 26 | 7.1 |
| Do | 58 | 48 | 43 | 39 | 27 | 26 | |

TABLE 9B.—ALUMINUM SULFATE/CITRIC ACID
[1/1 equivalent weight ratio]

| | Degrees Fann | | | | | | |
|---|---|---|---|---|---|---|---|
| | 600 | 300 | 200 | 100 | 6 | 3 | pH |
| 5 grams, initial | 20 | 12 | 9 | 5 | 1 | 1 | 9.1 |
| Do | 20 | 11 | 8.5 | 5 | 2 | 2 | |
| 5 grams, hot rolled | 43 | 29 | 23 | 18 | 11 | 10 | 8.8 |
| Do | 30 | 19 | 15 | 11 | 7 | 7 | 8.6 |

EXAMPLE X

Tests were run and results were evaluated to determine the effectiveness of metal complexes containing metal ions other than aluminum to inhibit the swelling of sodium bentonite. The tests were conducted as in previous examples. Five grams of the selected material were dissolved in 350 ml. of deionized water to form the complex after which the pH was adjusted to 9.5 with sodium hydroxide. 35 grams of sodium bentonite was then added to provide a suspension. Rheology was determined as in previous examples. The results of this test are as follows:

TABLE 10A.—FERRIC CHLORIDE/CITRIC ACID
[1/1 equivalent weight ratio]

| | Degrees Fann | | | | | | |
|---|---|---|---|---|---|---|---|
| | 600 | 300 | 200 | 100 | 6 | 3 | pH |
| 5 grams, initial | 27 | 17.5 | 14 | 9 | 3 | 3 | 8.8 |
| Do | 36.5 | 25 | 20 | 14.5 | 7 | 6 | 8.8 |
| 5 grams, hot rolled | 51 | 32 | 25 | 11 | 4 | 3 | 8.0 |
| Do | 63 | 41 | 32 | 21 | 6 | 5 | 8.1 |

TABLE 10B.—FERRIC SULFATE/CITRIC ACID
[1/1 equivalent weight ratio]

| | Degrees Fann | | | | | | |
|---|---|---|---|---|---|---|---|
| | 600 | 300 | 200 | 100 | 6 | 3 | pH |
| 5 grams, initial | 25 | 16 | 12.5 | 8 | 3 | 2.5 | 8.7 |
| 5 grams, hot rolled | 46 | 29 | 22.5 | 15 | 3 | 3 | 7.9 |

TABLE 10C.—FERRIC CHLORIDE/TARTARIC ACID
[1/1 equivalent weight ratio]

| | Degrees Fann | | | | | | |
|---|---|---|---|---|---|---|---|
| | 600 | 300 | 200 | 100 | 6 | 3 | pH |
| 5 grams, initial | 15 | 8 | 6 | 3 | 0 | 0 | 8.3 |
| 5 grams, hot rolled | 30 | 17.5 | 13 | 7.5 | 2 | 2 | 7.4 |

TABLE 10D.—CHROME SULFATE/CITRIC ACID
[1/1 equivalent weight ratio]

| | Degrees Fann | | | | | | |
|---|---|---|---|---|---|---|---|
| | 600 | 300 | 200 | 100 | 6 | 3 | pH |
| 5 grams, initial | 62 | 44 | 36 | 28 | 15 | 14 | 8.3 |
| 5 grams, hot rolled | 95 | 64 | 50 | 36 | 13 | 12 | 8.5 |

TABLE 10E.—ZIRCONYL SULFATE/CITRIC ACID
[1/1 equivalent weight ratio]

| | Degrees Fann | | | | | | |
|---|---|---|---|---|---|---|---|
| | 600 | 300 | 200 | 100 | 6 | 3 | pH |
| 5 grams, initial | 20 | 11 | 8 | 4.5 | .5 | 0 | 8.6 |
| 5 grams, hot rolled | 56 | 35 | 26 | 16.5 | 3 | 2 | 8.5 |

TABLE 10F.—LANTHANUM NITRATE/CITRIC ACID
[1/1 equivalent weight ratio]

| | Degrees Fann | | | | | | |
|---|---|---|---|---|---|---|---|
| | 600 | 300 | 200 | 100 | 6 | 3 | pH |
| 5 grams, initial | 20 | 11 | 8 | 4.5 | 0 | 0 | 9.0 |
| 5 grams, hot rolled | 30 | 17 | 12 | 6.5 | 0 | 0 | 8.4 |

TABLE 10G.—FERROUS SULFATE/CITRIC ACID
[1/1 equivalent weight ratio]

| | Degrees Fann | | | | | | |
|---|---|---|---|---|---|---|---|
| | 600 | 300 | 200 | 100 | 6 | 3 | pH |
| 5 grams, initial | 19 | 11 | 8 | 5 | 1 | 0 | 7.6 |
| 5 grams, hot rolled | 23 | 12.5 | 9 | 5 | .5 | 0 | 8.3 |

TABLE 10H.—NO ADDITIVE

| | Degrees Fann | | | | | | |
|---|---|---|---|---|---|---|---|
| | 600 | 300 | 200 | 100 | 6 | 3 | pH |
| Blank | 150 | 112 | 95 | 74 | 41 | 40 | 9.3 |
| Blank, hot rolled | 238 | 171 | 144 | 110 | 52 | 48 | 8.4 |

It should be noted that the samples tested in Table 10B were solubilized by the addition of sulfuric acid. Additionally, samples tested in Tables 10A and 10B indicated that, although inhibition of swelling occurred, the metal ion was not entirely complexed, as a light precipitate appeared at a pH of less than 7. As exemplified by these tables, some uses and environments may require increased levels of a complexing component to entirely complex the metal ion even though some, and satisfactory, complexing and inhibition of swelling will occur at less than stoichiometric levels. This is further exemplified by samples in Table 10D wherein it was found that, although no precipitate was found at alkaline pH's below about 9.5, a slight precipitate did appear as the pH increased over 9.5. Our tests have indicated that this problem can be corrected by utilizing increased levels of the complexing component to form the complex.

EXAMPLE XI

Tests were run and results were evaluated in order to determine the effect of calcium ion contamination in an aqueous alkaline system containing the complex as used in the present invention. Unless the metal ion is sufficiently complexed, calcium will react with the complexing component, allowing the metal ion to precipitate out of solution. Although some ratios of metal ion to complexing component tested produced an opalescence, it was discovered that the complexes were remarkably stable at concentrations of calcium as high as 3,000 mg./l. and at alkaline pH's as high as 11.45.

Aqueous solutions containing 2 grams of an aluminum sulfate-citric acid complex were prepared. Sufficient sodium chloride was added to obtain a 6% concentration. Calcium chloride dihydrate was used to prepare solutions containing 2,000, 3,000 and 12,000 parts per million calcium ion. The solutions were mixed so that a final volume of 100 ml. containing 1 gram aluminum complex, 3% sodium chloride and a selected concentration of calcium ion was obtained. Two mixtures were prepared, one with an aluminum sulfate-citric acid complex at a 1/0.6 equivalent weight ratio and one at a 1/1 equivalent weight ratio. These solutions were titrated with a sodium hydroxide solution at a .25 per ml. concentration. Volume measurements were found to be accurate to 0.001 ml. since a microburette was used. Each solution was stirred with a magnetic mix-stirrer while incremental additions of the sodium hydroxide solution were added. After each incremental sodium hydroxide addition, the pH was recorded after stabilization, and thereafter solution observations were made. All data was obtained at ambient temperature. The results of this test are illustrated in the following tables:

TABLE 11A

[1/0.6 equivalent weight ratio: complex concentration—1 gram per 100 ml.; calcium concentration—1,000 mg./l.]

| NaOH (.25 grams per ml.) added, ml. | pH | Observations |
|---|---|---|
| 0 | 2.15 | No precipitate. |
| 0.20 | 2.75 | Do. |
| 0.40 | 5.80 | Do. |
| 0.50 | 7.85 | Do. |
| 0.60 | 9.40 | Do. |
| 0.70 | 10.80 | Slight precipitate. |

TABLE 11B

[1/1 equivalent weight ratio: complex concentration—1 gram per 100 ml.; calcium concentration—1,000 mg./l.]

| NaOH (.25 grams per ml.) added, ml. | pH | Observations |
|---|---|---|
| 0 | 2.20 | No precipitate. |
| 0.20 | 2.80 | Do. |
| 0.40 | 4.05 | Do. |
| 0.50 | 7.60 | Do. |
| 0.60 | 9.25 | Do. |
| 0.70 | 10.60 | Do. |
| 0.80 | 11.20 | Do. |
| 0.90 | 11.40 | Do. |

TABLE 11C

[1/0.6 equivalent weight ratio: complex concentration—1 gram per 100 ml.; calcium concentration—1,500 mg./l.]

| NaOH (.25 grams per ml.) added, ml. | pH | Observations |
|---|---|---|
| 0 | 2.20 | No precipitate. |
| 0.2 | 2.85 | Do. |
| 0.4 | 5.50 | Do. |
| 0.5 | 7.80 | Do. |
| 0.6 | 9.40 | Do. |
| 0.7 | 10.76 | Slight opalescence. |
| 0.8 | 11.20 | Do. |
| 0.9 | 11.40 | Turbid. |
| 1.0 | 11.45 | Curd formed. |

TABLE 11D

[1/1 equivalent weight ratio: complex concentration—1 gram per 100 ml., calcium concentration—1,500 mg./l.]

| NaOH (.25 grams per ml.) added, ml. | pH | Observations |
|---|---|---|
| 0 | 2.20 | No precipitate. |
| 0.20 | 2.60 | Do. |
| 0.40 | 4.00 | Do. |
| 0.50 | 6.50 | Do. |
| 0.60 | 8.80 | Do. |
| 0.70 | 10.70 | Do. |
| 0.80 | 11.10 | Do. |
| 0.90 | 11.35 | Do. |
| 1.00 | 11.45 | Do. |

TABLE 11E

[1/1 equivalent weight ratio: complex concentration—1 gram per 100 ml.; calcium concentration—2,000 mg./l.]

| NaOH (.25 grams per ml.) added, ml. | pH | Observations |
|---|---|---|
| 0 | 2.15 | No precipitate. |
| 0.20 | 2.70 | Do. |
| 0.40 | 4.30 | Do. |
| 0.50 | 7.40 | Do. |
| 0.60 | 9.25 | Do. |
| 0.70 | 10.55 | Do. |
| 0.80 | 11.10 | Do. |
| 0.90 | 11.40 | Do. |
| 1.00 | 11.50 | Turbid. |

After the turbidity developed in this experimentation, an additional 1 gram treatment of the complex was added to the system and thereafter the turbidity completely redissolved. An additional 0.70 ml. of NaOH was used to raise the pH from 6.4 back to 11.35 at which point a slight opalescence was observed.

TABLE 11F

[1/0.6 equivalent weight ratio: complex concentration—1 gram per 100 ml.; calcium concentration—2,000 mg./l.]

| NaOH (.25 grams per ml.) added, ml. | pH | Observations |
|---|---|---|
| 0 | 2.30 | No precipitate. |
| 0.20 | 3.10 | Do. |
| 0.40 | 5.70 | Do. |
| 0.50 | 7.80 | Do. |
| 0.60 | 9.50 | Do. |
| 0.70 | 10.80 | Turbid. |
| 0.80 | 11.15 | Do. |
| 0.90 | 11.40 | Precipitate formed. |

TABLE 11G

[1/1 equivalent weight ratio: complex concentration—1 gram per 100 ml.; calcium concentration—2,500 mg./l.]

| NaOH (.25 grams per ml.) added, ml. | pH | Observations |
|---|---|---|
| 0 | 2.20 | No precipitate. |
| 0.2 | 2.80 | Do. |
| 0.4 | 4.00 | Do. |
| 0.5 | 6.30 | Do. |
| 0.6 | 8.85 | Do. |
| 0.7 | 10.00 | Do. |
| 0.8 | 11.00 | Do. |
| 0.9 | 11.30 | Do. |
| 1.0 | 11.45 | Turbid. |

TABLE 11H

[1/1 equivalent weight ratio: complex concentration—1 gram per 100 ml.; calcium concentration—3,000 mg./l.]

| NaOH (.25 grams per ml.) added, ml. | pH | Observations |
|---|---|---|
| 0 | 2.20 | No precipitate. |
| 0.2 | 2.80 | Do. |
| 0.4 | 4.20 | Do. |
| 0.5 | 6.90 | Do. |
| 0.6 | 9.45 | Do. |
| 0.7 | 10.50 | Do. |
| 0.8 | 11.10 | Opalescent. |
| 0.9 | 11.35 | Precipitate. |

EXAMPLE XII

Tests were conducted as in Example XI to determine the effect of calcium ion contamination in an aqueous alkaline system containing aluminum lignosulfonate complexes prepared in accordance with the teachings of U.S. Pat. No. 2,771,421. An aluminum ligonsulfonate-oxalic acid material was prepared by heating to 80° C. under agitation 333.33 grams of 32% by weight calcium lignosulfonate solution having 5.6% by weight calcium and 62.2% by weight lignin. 33.23 grams of aluminum sulfate having sulfate equivalent to the calcium present in the lignosulfonate was added over about a 2 minute period. 10.22 grams of oxalic acid, equivalent to 11% of the weight of lignin present, was then added. The sample was then filtered through Munktell's No. 006 filter paper and was found to contain 26.8% by weight solids and spray dried. A second sample was prepared by complexing aluminum sulfate with calcium lignosulfonate as above and then adding 7.30 grams of citric acid, equivalent to 11% by weight of lignin present. The sample was agitated at 80° C. for about 20 minutes and filtered as above and was spray dried. The sample contained 25.8% solids. 2 grams of the aluminum lignosulfonate-oxalic acid complex was added to a 6% sodium chloride aqueous system. 50 ml. of this solution was mixed with 50 ml. of a 2000 p.p.m. calcium ion solution to a provide a solution containing 1 gram aluminum lignosulfonate-oxalic acid complex, 3% sodium chloride and 1000 p.p.m. calcium ion. This solution was placed on a magnetic stirrer and incremental additions of a 1 ml. 0.25 grams NaOH solution were added by means of a microburette. The results are as follows:

TABLE 12A.—ALUMINUM LIGNOSULFONATE-OXALIC ACID COMPLEX

[1 gram, 3% NaCl and 1,000 p.p.m. Ca++]

| NaOH added, ml. (1 ml.= 0.25 g. NaOH) | pH | Observations |
|---|---|---|
| 0 | 2.65 | Clear. |
| 0.12 | 5.50 | Turbid |
| 0.15 | 8.60 | Precipitate. |
| 0.20 | 9.65 | Heavy precipitate. |
| 0.30 | 11.10 | Do. |
| 0.35 | 11.20 | Do. |
| 0.40 | 11.35 | Do. |
| 0.50 | 11.50 | Do. |

The resulting solution was filtered and the filtrate analyzed for soluble aluminum content. Of the 6.94 mg. of aluminum originally added, 3.5 mg. was found to be soluble. 49.6% of the aluminum originally added was precipitated out of solution.

This test was repeated at a calcium level of 2000 p.p.m. The results are shown in Table 12B.

TABLE 12B.—ALUMINUM LIGNOSULFONATE-OXALIC ACID COMPLEX

[1 gram 3% NaCl, 2,000 p.p.m. Ca++]

| NaOH added, ml. (1 ml.= 0.25 g. NaOH) | pH | Observations |
|---|---|---|
| 0 | 2.70 | Clear. |
| 0.05 | 4.45 | Turbid. |
| 0.10 | 5.00 | Do. |
| 0.15 | 7.75 | Heavy precipitate. |
| 0.20 | 9.10 | Do. |
| 0.30 | 10.40 | Do. |
| 0.40 | 10.95 | Do. |
| 0.50 | 11.20 | Do. |
| 0.60 | 11.40 | Do. |

The aluminum remaining in solution was 3.0 mg. 56.8% of the metal ion was precipitated out of solution.

An aluminum lignosulfonate-citric acid complex was investigated in the same manner. Two duplicate tests were conducted at a calcium concentration of 2000 mg./1. The results of this test are shown in Tables 12C and 12D below:

TABLE 12C.—ALUMINUM LIGNOSULFONATE-CITRIC ACID COMPLEX

[1 gram, 3% NaCl, 2,000 mg./l. Ca++]

| NaOH Added, ml. (1 ml.= 0.25 g. NaOH) | pH | Observations |
|---|---|---|
| 0 | 2.80 | Clear. |
| 0.10 | 5.40 | D.O. |
| 0.20 | 9.10 | Opalescence. |
| 0.30 | 10.90 | Heavy precipitate. |
| 0.40 | 11.20 | Do. |
| 0.50 | 11.30 | Do. |
| 0.60 | 11.40 | Do. |
| 0.70 | 11.50 | Do. |
| 0.80 | 11.55 | Do. |

The soluble aluminum content was found to be 1 mg. 85.6% of the added aluminum was precipitated out of the alkaline solution.

TABLE 12D.—ALUMINUM LINGOSULFONATE-CITRIC ACID COMPLEX

[1 gram, 3% NaCl, 2,000 mg./l. Ca++]

| NaOH Added, ml. (1 ml.= 0.25 g. NaOH) | pH | Observations |
|---|---|---|
| 0 | 3.00 | Clear. |
| 0.10 | 5.00 | Do. |
| 0.15 | 8.12 | Do. |
| 0.20 | 7.50 | Turbid. |
| 0.25 | 10.50 | Pronounced precipitate. |
| 0.30 | 10.90 | Heavy precipitate. |
| 0.35 | 11.10 | Do. |
| 0.45 | 11.30 | Do. |
| 0.50 | 11.40 | Do. |
| 0.60 | 11.45 | Do. |
| 0.70 | 11.55 | Do. |

The soluble aluminum was 1.2 mg. 82.8% of the added aluminum had precipitated out of solution.

An aluminum sulfate citric acid complex at a 1-to-1 equivalent weight ratio containing no lignosulfonate was subjected to the same test as illustrated in Tables 12C and 12D. The results of this test indicated that the material containing no lignosulfonate produced a complex which did not precipitate out of solution, thus conclusively indicating that the presence of lignosulfonate produces a less effective material.

TABLE 12E.—ALUMINUM-CITRIC ACID COMPLEX

[1 gram, 3% NaCl, 2,000 p.p.m. Ca++]

| NaOH Added, ml. (1 ml.= 0.25 g. NaOH) | pH | Observations |
|---|---|---|
| 0 | 2.20 | Clear. |
| 0.10 | 2.38 | Do. |
| 0.20 | 2.80 | Do. |
| 0.30 | 3.00 | Do. |
| 0.40 | 7.10 | Do. |
| 0.50 | 7.95 | Do. |
| 0.60 | 11.02 | Do. |
| 0.65 | 11.45 | Turbid. |

It should be noted that the turbidity noted at pH 11.45 disappeared on standing for about ½ hour and produced a clear solution. In this case because no lignosulfonate was present, the added aluminum was 15.0 mg. The sample, after caustic treatment noted in Table 12E, was filtered and the filtrate analyzed for aluminum content. It was found that the filtrate contained 15.0 mg. Al showing that the complex was 100% soluble and that none of the metal ion had precipitated out of solution.

EXAMPLE XIII

As stated above, we are aware of United States Letters Patent No. 2,771,421, entitled "Oil Well Drilling Fluids," wherein the inventor teaches the use of aluminum lignosulfonate complexes as drilling fluid additives. This teaching incorporates a calcium lignosulfonate which is treated with aluminum sulfate. Oxalic acid, or a related organic acid is then added. Although this composition incorporates to some extent starting materials as taught by the present invention, it is believed that the patented composition is completely distinguishable from the present inhibitors. For example, the lignosulfonate in the patent acts primarily as a dispersant, rather than as an inhibitor of shale swelling. Additionally, since the lignosulfonate material may prevent complete complexing of the metal ion, this drilling fluid would probably yield an aluminum precipitate at pH's over about 10.0 especially in environments having present a high calcium ion content. Of particular importance is the fact that this patent partially complexes the aluminum with lignosulfonate and partially with an acid. Our process uses a metal ion completely complexed with the acid or salt thereof rather than with a lignosulfonate. It is believed that this alteration in the complex structure permits our process to be more effective in inhibition of shales when compared to a process using the patented lignosulfonate drilling fluid.

For test purposes, an aluminum lignosulfonate complex containing citric acid was prepared. A sample was prepared by complexing 33.23 grams aluminum sulfate with 32% calcium lignosulfonate having present 5.6% by weight calcium and 62.2% by weight lignin and then adding 7.30 grams of citric acid, equivalent to 11% by weight of lignin present. The sample was agitated at 80° C. for about 20 minutes and filtered. This sample contained 25.8% solids. The precipitate was removed by filtration and the filtrate spray dried. An aluminum sulfate-citric acid complex at 1-to-1 equivalent weight ratio was also prepared as described in Example I. These samples were tested for inhibition of 9% hydrated sodium bentonite suspensions using a post-teratment process. Samples were tested at a treatment level of 5 grams. After addition of the selected sample, the pH was adjusted to 9.5. Flow properties were determined initially, after hot rolling at 150° F. for 16 hours and after pH adjustment to about 9.2. The results of this test indicated that the aluminum sulfate-citric acid complex containing no lignosulfonate was more effective as a post treatment inhibitor for hydrated shale at a treatment level of 5 grams. The results of this test are as follows:

TABLE 13

|  | Degrees Fann | | | | | | |
|---|---|---|---|---|---|---|---|
|  | 600 | 300 | 200 | 100 | 6 | 3 | pH |
| 5 grams Al LSO₃ plus citric acid, initial | 142 | 87 | 64 | 39 | 6 | 4 | 9.3 |
| 5 grams Al LSO₃ plus citric acid, hot rolled | 215 | 149 | 120 | 81 | 22 | 18 | 7.9 |
| 5 grams Al LSO₃ plus citric acid, pH adjusted | 200 | 137 | 107 | 69 | 12 | 9 | 9.2 |
| 5 grams aluminum sulfate-citric acid, initial | 78 | 44 | 32 | 18 | 2 | 1 | 9.4 |
| 5 grams aluminum sulfate-citric acid, hot rolled | 150 | 100 | 79 | 53 | 13 | 11 | 8.3 |
| 5 grams aluminum sulfate-acid citric, pH adjusted | 151 | 97 | 76 | 49 | 9 | 7 | 9.2 |
| Blank, initial | 235 | 176 | 149 | 115 | 54 | 50 | 9.2 |
| Blank, hot rolled | >300 | 286 | 249 | 200 | 102 | 95 | 8.8 |
| Blank, pH adjusted | >300 | 238 | 201 | 155 | 71 | 66 | 9.5 |

EXAMPLE XIV

The present Example compares an aluminum sulfate lignosulfonate complex containing citric acid, and made as in Example XIII, with a 1-to-1 equivalent weight ratio aluminum sulfate-citric acid complex in a test to determine erosion characteristics of fluids containing a "gumbo" shale and the complexes. Test "gumbo" discs were prepared by pressing 100 grams of "gumbo" in a 2⅛ inch die press at 6,000 pounds per square inch pressure applied over a 2 hour period. The test discs were removed and exposed in a 98% relative humidity for 72 hours. A recirculating system was used to circulate the test fluid containing the selected complex onto the surface of the disc at a rate of 145 ml./sec. through a 1 cm. orifice which was 13 mm. above the sample. The circulating fluid temperature was 105° F. Four separate fluids were tested in this fashion on 4 discs. The first fluid (Fluid 1) contained only tap water at pH 9.3. The second fluid (Fluid 2) contained tap water and 5 grams of the aluminum lignosulfonate complex at pH 9.3. The third sample (Fluid 3) contained tap water and 5 grams of the aluminum sulfate-citric acid complex adjusted to pH 9.3. This test indicated that the aluminum sulfate-citric acid complex-treated disc eroded considerably less than did the disc containing the aluminum lignosulfonate additive. The results are described in the Table below:

TABLE 14

| Fluid | Effect on disc |
|---|---|
| 1 | Fluid cut hole through specimen in 20 minutes. After 60 minutes, hole had diameter of approximately 40 mm. Only rim of original disc remained after test period. |
| 2 | Surface eroded at center and edges after 100 minutes. |
| 3 | Slight erosion at edge of disc observed after 100 minutes. |

EXAMPLE XV

The present Example compares the ability of the metal ion complex as utilized in the present invention to inhibit swelling of shale when compared to the effect obtained when using prior art and less effective materials. For test purposes, the sample inhibitor was dissolved in 350 ml. of deionized water and the pH adjusted to 9.5. 35 grams of sodium bentonite was then added to the aqueous alkaline system and the suspension stirred for 15 minutes. Rheology was determined as in previous examples, both before and after the suspensions were hot rolled at 150° F. for 16 hours. Rheology was also determined after pH adjustment to 9.2 to 9.5. The inhibitors tested were: calcium hydroxide (Sample A); calcium sulfate (Sample B); aluminum sulfate-citric acid complex (1-to-1 equivalent weight ratio) (Sample C); Neptune Sea Salt (Sample D); blank fluid (Sample E). All tests were conducted using 5 grams of sample inhibitor. The results indicated that the complex was comparable to the effects obtained by calcium sulfate and was more effective than calcium hydroxide and Neptune Sea Salt. The results are shown in the following Table:

TABLE 15

|  | Degrees Fann | | | | | | |
|---|---|---|---|---|---|---|---|
|  | 600 | 300 | 200 | 100 | 6 | 3 | pH |
| A, initial | 35 | 30 | 28 | 25 | 8 | 7 | 12.2 |
| A, hot rolled | 34 | 24 | 20 | 16 | 8 | 6 | 11.2 |
| pH adjusted | 40 | 30 | 26 | 21 | 12 | 8 | 11.3 |
| B, initial | 14 | 10 | 8 | 6.5 | 5 | 5 | 8.1 |
| B, hot rolled | 12 | 7.5 | 6 | 5 | 2 | 2 | 7.9 |
| pH adjusted | 13 | 8 | 6.5 | 5 | 2 | 3 | 8.2 |
| C, initial | 12 | 6 | 4 | 2 | .5 | 0 | 9.3 |
| C, hot rolled | 25 | 14.5 | 11 | 6.5 | 1 | 1 | 8.6 |
| pH adjusted | 21 | 11.5 | 8 | 4 | 0 | 0 | 9.4 |
| D, initial | 14 | 9 | 7.5 | 6 | 4 | 4 | 8.2 |
| D, hot rolled | 23 | 16 | 13 | 10 | 7.5 | 7.5 | 7.5 |
| pH adjusted | 25 | 18 | 16 | 13 | 9 | 10 | 9.1 |
| E, initial | 160 | 121 | 103 | 83 | 47 | 46 | 9.2 |
| E, hot rolled | 275 | 210 | 178 | 134 | 63 | 58 | 8.7 |
| pH adjusted | 216 | 160 | 142 | 97 | 47 | 43 | 9.4 |

EXAMPLE XVI

The present Example compares the ability of the metal ion complex as utilized in the present process to inhibit hydrated shale in a post treatment process when compared to the effect obtained with prior art materials tested in Example XV. For test purposes, the selected inhibitor material was dissolved in a hydrated sodium bentonite suspension contaminated with 1.5% sodium chloride and 1,090 parts per million calcium and magnesium ion. The pH of each sample was adjusted to 9.5 and the suspensions stirred for 15 minutes. Rheology was determined as in Example XV. The samples tested were as in Example XV (except for Sample D, which was not tested) and are identified as in Example XV. The results of this test indicated that the complex was a much more effective inhibitor for hydrated shales in a post treatment process than any of the comparative samples. The results of this test are further defined in the following Table:

TABLE 16

|  | Degrees Fann | | | | | | |
| --- | --- | --- | --- | --- | --- | --- | --- |
|  | 600 | 300 | 200 | 100 | 6 | 3 | pH |
| A, initial | >300 | 276 | 245 | 243 | 94 | 82 | 11.8 |
| A, hot rolled | 131 | 116 | 106 | 94 | 37 | 24 | 10.4 |
| pH adjusted | 105 | 91 | 83 | 75 | 35 | 28 | 10.2 |
| B, initial | 62 | 54 | 50 | 46 | 34 | 31 | 9.4 |
| B, hot rolled | 41 | 34 | 31 | 27 | 19 | 18 | 7.5 |
| pH adjusted | 52 | 44 | 40 | 35 | 24 | 23 | 9.2 |
| C, initial | 20 | 11 | 8 | 5 | 1 | 1 | 9.4 |
| C, hot rolled | 30 | 20 | 16.5 | 12 | 9 | 9 | 8.8 |
| pH adjusted | 26 | 14.5 | 11 | 7 | 2 | 2 | 9.3 |
| E, initial | 72 | 62 | 58 | 52 | 38 | 36 | 9.3 |
| E, hot rolled | 46 | 39 | 35 | 31 | 22 | 21 | 7.5 |
| pH adjusted | 59 | 47 | 41.5 | 35 | 30 | 23 | 9.1 |

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. A process for inhibiting the swelling of shale in an aqueous alkaline medium comprising the steps of:
  A. Preparing an aqueous medium;
  B. Adding to said medium a polyvalent metal ion selected from the class consisting of bismuth, chromium, cobalt, iron, lanthanum, manganese, nickel, tin, titanium, zinc, and zirconium, said ion being complexed by a complexing component selected from the class consisting of acetic, citric, formic, lactic, oxalic, and tartaric acid, the alkali metal and ammonium salts and mixtures thereof, the equivalent weight ratio of polyvalent metal ion to complexing component being at least about 1-to-.2;
  C. Adjusting the pH of the medium to above 7.0; and
  D. Adding to said medium shale to provide a suspension.

2. The process of Claim 1 wherein the polyvalent metal ion is provided in the form of a water soluble salt.

3. The process of Claim 1 wherein the equivalent weight ratio of polyvalent metal ion to complexing component is about 1-to-1.

4. The process of Claim 1 wherein the shale is bentonite.

5. A process for inhibiting the swelling of shale in an aqueous alkaline medium comprising the steps of:
  A. Preparing an aqueous medium;
  B. Forming in said medium a polyvalent metal ion complex by the reaction of a member selected from the class consisting of aluminum chloride and aluminum sulfate with acetic acid in an amount to produce a complex having an equivalent weight ratio of polyvalent metal ion to acetic acid of at least about 1-to-.2;
  C. Adjusting the pH of the medium to above 7.0; and
  D. Adding to said medium shale to provide a suspension.

6. The process of Claim 5 wherein the shale is bentonite.

7. A process for inhibiting the swelling of shale in an aqueous alkaline medium comprising the steps of:
  A. Preparing an aqueous medium;
  B. Adding to said medium a polyvalent metal ion of aluminum, said ion being complexed by a complexing component selected from the class consisting of citric, formic, lactic, oxalic, and tartaric acid, the alkali metal and ammonium salts and mixtures thereof, the equivalent weight ratio of polyvalent metal ion to complexing component being at least is about 1-to-.1.
  C. Adjusting the pH of the medium to above 7.0; and
  D. Adding to said medium shale to provide a suspension.

8. The process of Claim 7 wherein the polyvalent metal ion is provided in the form of a water soluble salt.

9. The process of Claim 7 wherein the equivalent weight ratio of polyvalent metal ion to complexing component is about 1-to-1.

10. The process of Claim 7 wherein the shale is bentonite.

11. A process for inhibiting the swelling of shale in an aqueous alkaline medium comprising the steps of:
  A. Preparing an aqueous alkaline medium having a pH above 7.0;
  B. Adding to said medium a polyvalent metal ion selected from the class consisting of aluminum, bismuth, chromium, cobalt, iron, lanthanum, manganese, nickel, tin, titanium, zinc and zirconium, said ion being complexed by a complexing component selected from the class consisting of acetic, citric, formic, lactic, oxalic and tartaric acid, the alkali metal and ammonium salts and mixtures thereof, the equivalent weight ratio of polyvalent metal ion to complexing component being at least about 1-to-.2; and
  C. Adding to said medium shale to provide a suspension.

12. The process of Claim 11 wherein the polyvalent metal ion is aluminum.

13. The process of Claim 11 wherein the polyvalent metal ion is iron.

14. The process of Claim 11 wherein the polyvalent metal ion is chromium.

15. The process of Claim 11 wherein the polyvalent metal ion is in the form of a water soluble salt.

16. The process of Claim 11 wherein the equivalent weight ratio of polyvalent metal ion to complexing component is about 1-to-1.

17. The process of Claim 11 wherein the shale is bentonite.

18. A process for inhibiting the swelling of hydrated shale comprising the steps of:
  A. Adding to an aqueous medium contacting said shale a polyvalent metal ion selected from the class consisting of bismuth, chromium, cobalt, iron, lanthanum, manganese, nickel, tin, titanium, zinc, and zirconium, said ion being complexed by a complexing component selected from the class consisting of acetic, citric, formic, lactic, oxalic, and tartaric acid, the alkali metal and ammonium salts and mixtures thereof, the equivalent weight ratio of polyvalent metal ion to complexing component being at least about 1-to-.2; and
  B. Adjusting the pH of said medium to above 7.0.

19. The process of Claim 18 wherein the polyvalent metal ion is iron.

20. The process of Claim 18 wherein the polyvalent metal ion is chromium.

21. The process of Claim 18 wherein the polyvalent metal ion is provided in the form of water soluble salt.

22. The process of Claim 18 wherein the equivalent weight ratio of polyvalent metal ion to complexing component is about 1-to-1.

23. The process of Claim 18 wherein the shale is bentonite.

24. A process for inhibiting the swelling of hydrated shale comprising the steps of:
  A. Forming in an aqueous medium contacting said shale a polyvalent metal ion complex, said complex being formed by the reaction of a member selected from the class consisting of aluminum chloride and aluminum sulfate with acetic acid in an amount to produce a complex having an equivalent weight ratio of polyvalent metal ion to acetic acid of at least about 1-to-.2; and B. Adjusting the pH of said medium to above 7.0.

25. The process of Claim 24 wherein the shale is bentonite.

26. A process for inhibiting the swelling of hydrated shale comprising the steps of:
   A. Adding to an aqueous medium contacting said shale a polyvalent metal ion of aluminum, said ion being complexed by a complexing component selected from the class consisting of citric, formic, lactic, oxalic, and tartaric acid, the alkali metal and ammonium salts and mixtures thereof, the equivalent weight ratio of polyvalent metal ion to complexing component being at least about 1-to-.2; and
   B. Adjusting the pH of said medium to above 7.0.

27. The process of Claim 26 wherein the polyvalent metal ion is provided in the form of a water soluble salt.

28. The process of Claim 26 wherein the equivalent weight ratio of polyvalent metal ion to complexing component is about 1-to-1.

29. A process for inhibiting the swelling of hydrated shale in an aqueous medium comprising the steps of:
   A. Adjusting the pH of the aqueous medium in contact with said hydrated shale to above 7.0; and
   B. Adding to said medium a polyvalent metal ion selected from the class consisting of aluminum, bismuth, chromium, cobalt, iron, lanthanum, manganese, nickel, tin, titanium, zinc, and zirconium, said ion being complexed by a complexing component selected from the class consisting of acetic, citric, formic, lactic, oxalic, and tartaric acid, the alkali metal and ammonium salts and mixtures thereof, the equivalent weight ratio of polyvalent metal ion to complexing component being at least about 1-to-.2.

30. The process of Claim 29 wherein the polyvalent metal ion is provided in the form of a water soluble salt.

31. The process of Claim 29 wherein the shale is formation gumbo.

32. A process for inhibiting the swelling of hydrated shale in an aqueous medium comprising the steps of:
   A. Adjusting the pH of the aqueous medium in contact with said hydrated shale to above 7.0; and
   B. Forming in said medium a polyvalent metal ion complex, said complex being formed by the reaction of a member selected from the class consisting of aluminum chloride and aluminum sulfate with acetic acid in an amount to produce a complex having an equivalent weight ratio of polyvalent metal ion to acetic acid of at least about 1-to-.2.

33. The process of Claim 32 wherein the shale is formation gumbo.

34. A process for inhibiting the swelling of hydrated shale in an aqueous medium comprising the steps of:
   A. Adjusting the pH of the aqueous medium in contact with said hydrated shale to above 7.0; and
   B. Forming in said medium a polyvalent metal ion of aluminum, said ion being complexed by a complexing component selected from the class consisting of citric, formic, lactic, oxalic and tartaric acid, the alkali metal and ammonium salts and mixtures thereof, the equivalent weight ratio of polyvalent metal ion to complexing component being at least about 1-to-.2.

35. The process of Claim 34 wherein the shale is formation gumbo.

References Cited

UNITED STATES PATENTS

| | | | |
|---|---|---|---|
| 3,603,399 | 9/1971 | Reed | 166—305 |
| 3,762,485 | 10/1972 | Chesser et al. | 166—305 |
| 2,856,355 | 10/1958 | Weiss et al. | 252—8.5 |
| 2,856,356 | 10/1958 | Weiss et al. | 252—8.5 |
| 2,802,783 | 8/1957 | Weiss et al. | 252.8.5 |
| 2,605,221 | 7/1952 | Hoeppel | 252—8.5 |
| 3,621,913 | 11/1971 | Braden | 166—272 |
| 2,109,858 | 3/1938 | Cannon | 252—8.5 |
| 3,108,069 | 10/1963 | Monroe et al. | 252—8.5 |
| 3,654,164 | 4/1972 | Sperry | 252—8.5 |

OTHER REFERENCES

Rogers, Composition and Properties of Oil Well Drilling Fluids, Third Edition, Pub. 1963, Pages 424 and 425.

HERBERT B. GUYNN, Primary Examiner

U.S. Cl. X.R.

166—305 R; 175—65; 252—8.5 A, 8.5 C, 8.55 R